July 1, 1924.
B. G. GOBLE
ARTIFICIAL FISH BAIT
Filed Feb. 6. 1923
1,499,819
2 Sheets-Sheet 1
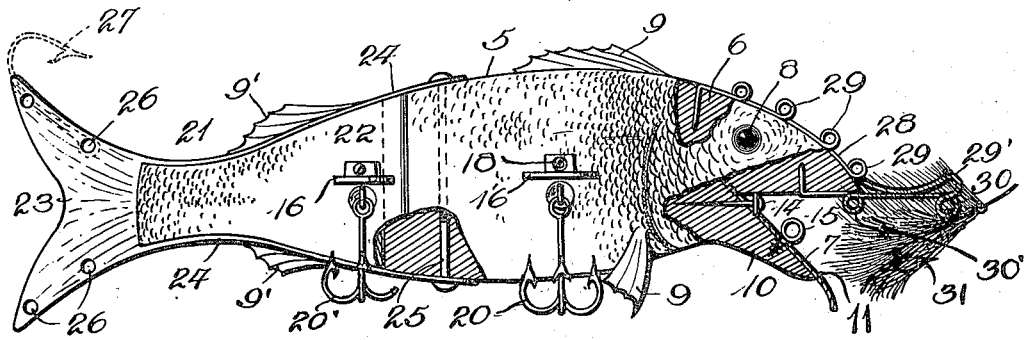
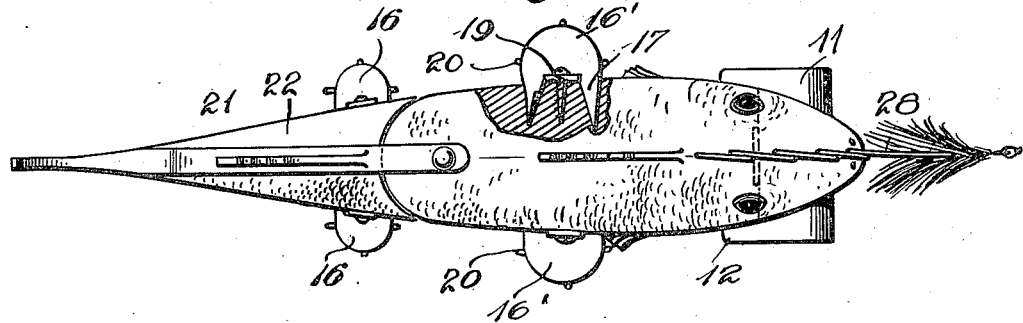
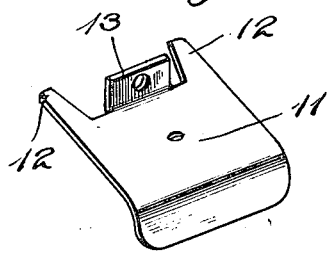
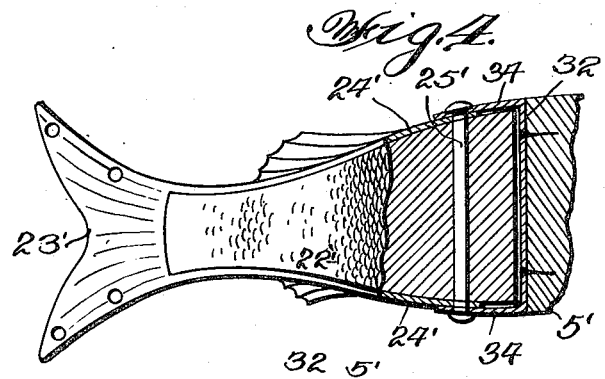
Inventor
B.G.Goble
By Burch+Huggins
Attorney

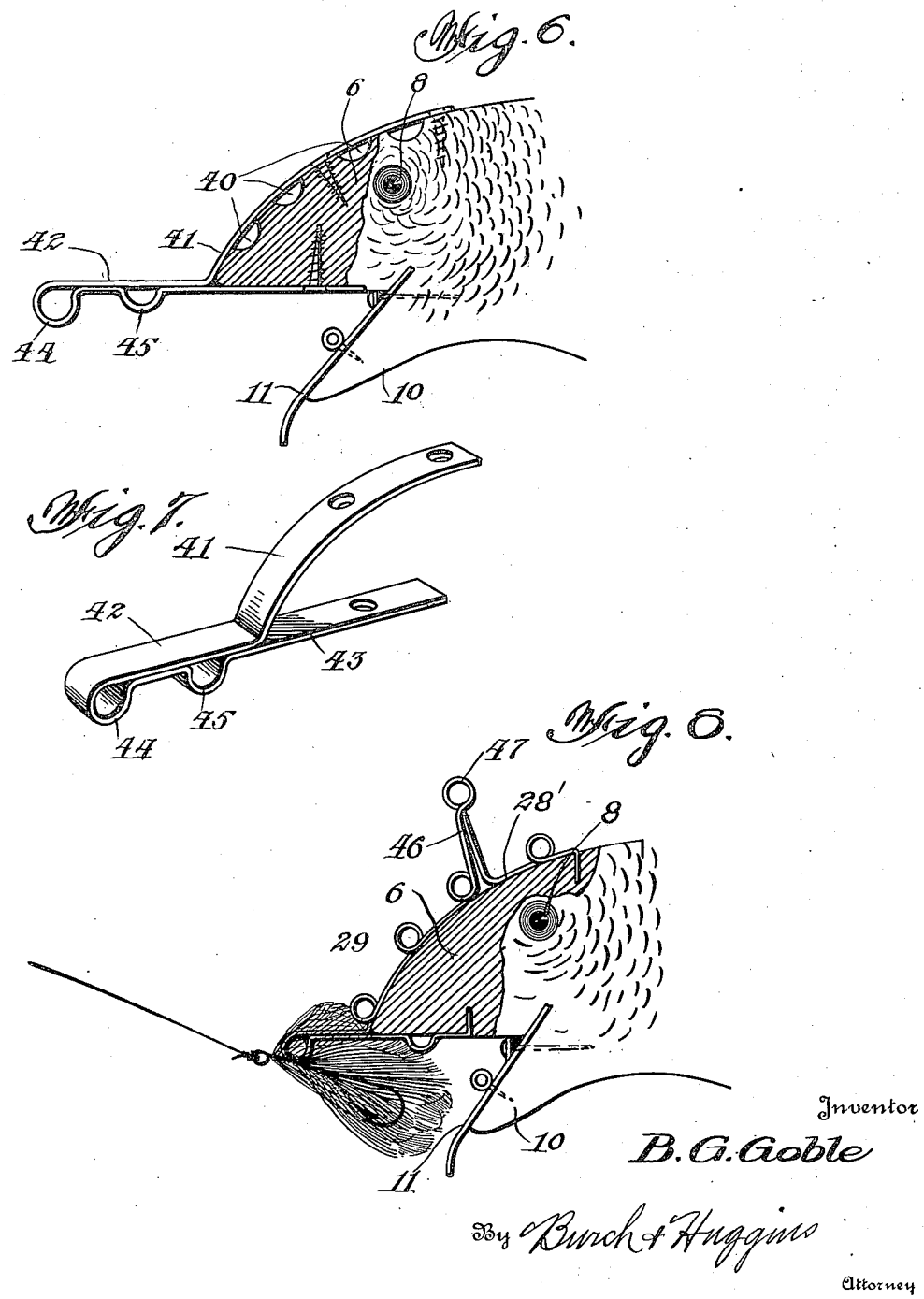

Patented July 1, 1924.

1,499,819

UNITED STATES PATENT OFFICE.

BERT G. GOBLE, OF TULSA, OKLAHOMA.

ARTIFICIAL FISH BAIT.

Application filed February 6, 1923. Serial No. 617,408.

*To all whom it may concern:*

Be it known that I, BERT G. GOBLE, a citizen of the United States, residing at Tulsa, in the county of Tulsa and State of Oklahoma, have invented certain new and useful Improvements in Artificial Fish Baits, of which the following is a specification.

My invention relates to improvements in artificial fish baits, and one of the principal objects of my invention is to provide a device of this kind that will be an effective lure by being made to closely resemble a live fish in its movements and appearance.

In fishing with an artificial minnow it is desirable to have the minnow make both a wiggling motion and a darting or wabbling motion as it is drawn through the water. In fish lures having a freely swinging tail for permitting a wiggling motion, as heretofore known, the line is attached at the end of the nose. With such a construction, the above mentioned tail-wiggling effect is attained only when used in a swift current. When the lure is drawn through still water, little or no wiggling of the tail and darting takes place.

I make it possible to obtain both of the life-like motions of wiggling and darting or wabbling under all water conditions by providing a lure, having a freely swinging tail and a dodge or course regulating mouth plate, with variable line fastening means, the point of attachment of the line and the bend of the free forward end of the mouth plate depending upon water conditions and the degree of wiggling and darting and depth of fishing desired.

Another object of my invention is to provide an artificial minnow with an open mouth styled to imitate a fish about to bite and formed so that the upper surface of the lower jaw is forwardly and downwardly inclined, and a dodge or course regulating plate fastened on said surface and having a bendable projecting forward end adapted to be vertically flexed for varying the dodge or course of the bait at will.

A further object is to provide means attached to the head of the bait for supporting a fly directly in front of the open mouth so as to give the appearance of a fish about to catch the fly.

Still another object of this invention is to generally improve and simplify fish baits.

With the above general objects in view, and others that will become apparent as the nature of the invention is better understood, the same consists in the novel form, combination and arrangement of parts hereinafter more fully described, shown in the accompanying drawing and claimed.

In the drawing, wherein like reference characters represent corresponding parts throughout the several views, Fig. 1 is a side elevational view, partly broken away, of a fish bait constructed in accordance with my invention, Fig. 2 is a top plan view, partly broken away, of the device shown in Fig. 1, Fig. 3 is a perspective view of the dodge or course regulating mouth plate, Fig. 4 is a fragmentary view, partly in side elevation and partly in section, showing a modified form of a part of the invention.

Fig. 5 is a top plan view of the device shown in Fig. 4.

Fig. 6 is a fragmentary view partly in side elevation and partly in section, showing the bait equipped with a modified form of line fastening and fly supporting means.

Fig. 7 is a perspective view of the strip of sheet metal employed in Fig. 6, and Fig. 8 is a view similar to Fig. 6 showing still another modification of the line fastening and fly supporting means.

Referring more in detail to the several views, —5— indicates the main buoyant body of the bait having a head —6— with an open mouth —7—, eyes —8— and fins —9—, the lower jaw —10— being provided with a flat forwardly and downwardly inclined upper surface upon which is fastened a dodge or course regulating plate —11—.

The plate —11— is of greater width than the head of the bait and projects beyond the forward end of the jaw —10— so as to provide a flexible forward end adapted to be bent up or down for regulating the course of the bait. The plate —11— preferably includes a pair of side rearwardly projecting tongues —12— which engage the sides of the head —6— so as to brace said plate, and an upturned apertured lug —13— is provided between the tongues so that a screw or nail —14— may be driven therethrough into the head for securing the plate in place. A screw eye —15— may also be passed through the plate —11— into the jaw —10— for further fastening the plate and for providing a means for attaching the line below the horizontal center of the bait in the open mouth.

Suitable planes —16— are attached to the sides of the body —5— by means of integral spurs —17— which are driven into the body and screws —18— which are driven through flanges —19—, of said planes, into the body. Hooks —20— are attached to the body —5— directly under the planes —16— so that the latter prevent said hooks from swinging up over the back of the bait and becoming hooked together.

A freely swinging tail section —21— is attached to the main body —5— and further fins —9'— and planes and hooks —16'— and —20'— respectively may be similarly carried thereby.

The swinging tail section embodies a rear body portion —22— of buoyant material, such as wood, and a tail per se —23—, preferably of light metal. The rear end of the main body —5— is preferably convex and the forward end of the rear body portion —22— is concave, so that these members may be closely related for giving a neat appearance and permitting limited free swinging of the tail section. The pivotal connection between the main body and the tail section preferably embodies metal strips —24— extending forwardly from the tail —23— along the top and bottom of the rear body portion —22— and flatly engaging the rear end of the body —5—, a pivot pin —25— being passed through the body —5— and the forward ends of the strips —24— and having its ends headed, as shown. The tail —23— may be provided with apertures —26— so that hooks may be tied thereto, if desired, as shown by dotted lines at —27—.

Associated with the upper jaw and adjacent the head portion of the bait is a variable line fastening and fly supporting member —28— which comprises a plurality of upper eyes —29— positioned one behind the other, and a forwardly projecting portion formed with an eye —30— for attaching a fly or the like —31— in position so as to give the appearance of the fish being about ready to catch said fly. The member —28— preferably includes also a loop —29'— above the eye —30— and an eye —30'— under the upper jaw as further points for attaching the line so that a fine adjustment of the action of the bait may be obtained. The member —28— preferably embodies a piece of wire looped to form the eyes and having sharpened ends directed into the under surface of the upper jaw and into the head rearwardly of the fish's eyes —8—, as shown in Fig. 1.

As shown in Figs. 4 and 5, the pivotal connection between the main body —5'— and rear body portion —22'— may be varied. In these figures the main body has a concave rear end to which is secured and fitted an arcuate plate —32— having projecting bendable sides —33— and rearwardly projecting top and bottom ears —34—. The rear body portion has the tail —23'— with forwardly extending top and bottom strips —24'— which terminate under the ears —34— rearwardly of the forward end of the portion —22'—, and a pivot pin —25'— passes through said portion —22'— and the strips —24'— and ears —34—. By bending the sides —33— of plate —32—, the limit of the swinging of the tail section may be varied.

When the bait is trolled or placed in a running stream, the inclined plate will force the bait to submerge or rise according to how the projecting end of said plate is bent, the plate inducing an erratic, darting or wabbling movement to the bait. The open mouth and freely swinging tail section add to the life-like appearance of the bait, and swinging of the tail section or wiggling of the bait is insured in still water by attaching the line farther back from the forward end of the body portion. The combination of the dodge regulating plate in the open mouth and the freely swinging tail section makes the device a "killing" bait, while the supporting of the fly directly in front of the open mouth adds to its effectiveness. Also, the swinging of the tail is varied readily and insured in slowly running streams by the provision of means for securing the line at a plurality of points at varying distances from the forward end of the main body.

It is to be noted that the open mouth of the fish is so formed as to present the lower jaw —10— in a forwardly and downwardly extending inclination so that this jaw alone will produce a wabbling or darting motion of the bait when the latter is drawn through the water, while this motion may be augmented or varied by the additional use of the plate —11—.

Referring to the form of the invention shown in Fig. 6, the head of the bait is provided with a series of transverse grooves —40— in its upper surface which are located progressively at greater distances from the forward end of the bait, and a sheet metal strip —41— is suitably fastened in place on the upper surface of the head of the bait longitudinally of the latter so as to overlie the grooves —40— and thereby provide a series of eyes which may be selectively employed for attachment of the line. The strip —41— preferably extends downwardly to a point in the same plane as the under surface of the upper jaw of the bait and then projects forwardly to provide an extension —42—. The strip is then return-bent to provide a lower leg —43— adapted to be suitably secured against the under surface of said upper jaw. This leg portion —43— may be offset as at —44— and —45— so as to provide a plurality of points forwardly of the forward end of the bait to which the line may be conveniently attached or from which a fly may be suspended as desired.

In the form of the invention shown in Fig. 8 the construction is substantially the same as that of Fig. 1 except that the strip —28'— is formed to provide an upwardly extending arm —46—, the outer or free end of which terminates in an eye —47—. By this arrangement the line may be attached to the eye —47— when a leverage is desired for causing the bait to swim deep. Obviously with the line so attached the nose of the fish will be pulled downward and cause the bait to submerge. Also, it is obvious that this lever arm may be employed with either of the forms of the invention shown in Figs. 1 and 6.

Minor changes may be made without departing from the spirit and scope of the invention as claimed.

What I claim as new is:—

1. A fish lure including a main body having a freely swinging tail section and formed with an open mouth, and a dodge regulating plate fastened in the open mouth of said main body.

2. In a fish lure, the combination with a main body portion having a freely swinging tail section, of means for varying the swinging of said tail section when the lure is retrieved, said means comprising means for securing the line at a plurality of points at varying distances from the forward end of said body portion.

3. In an artificial bait, a floatable main body, a freely swinging tail section attached to the rear end of the body, said body having an open mouth, and a plate rigidly secured in the open mouth of the body on the upper surface of the lower jaw of said body, the plate including a projecting forward end adapted to be flexed vertically for regulating the course of the bait when retrieved.

4. A device like that described in claim 1 wherein the dodge regulating plate is of greater width than the forward end of the body and embodies rearwardly projecting tongues having their inner edges engaging the sides of the head of the body portion, said plate further including a forward end portion projecting beyond the forward end of the body and adapted to be flexed vertically for regulating the course of the lure, when retrieved.

5. A device like that described in claim 3 wherein the line securing means embodies a member projecting forwardly of the forward end of the body portion and formed for the attachment of a fly thereto, said body portion having an open mouth.

6. A fish lure including a main body having a freely swinging tail section and formed with an open mouth, a dodge regulating plate fastened in the open mouth of said main body, and means for varying the swinging of said tail section when the lure is retrieved, said means comprising means for securing the line at a plurality of points at varying distances from the forward end of said body portion.

7. In combination with a fish lure including a main body portion formed with a head having an open mouth, of means rigid with said body portion and supporting a fly directly in front of the open mouth, said last named means further embodying means for varying the action of the lure when retrieved by providing means for the attachment of a line thereto at a plurality of points.

8. In a fish lure, the combination with a main body portion having a freely swinging tail section, of means to adjustably limit, at will, the degree of swinging movement allowed said tail section.

9. In a fish lure, a body portion having a plurality of transverse grooves in the upper surface of its forward end, and a longitudinal strip secured to the body and overlying said grooves so as to provide means for securing the line at plurality of points at varying distances from the forward end of said body portion, said strip embodying a forwardly extending member formed to support a fly in front of the forward end of the body, and said body having an open mouth so as to give the appearance of a bait about to catch a fly.

In testimony whereof I affix my signature.

BERT G. GOBLE.